(12) United States Patent
Salgo

(10) Patent No.: US 6,396,004 B2
(45) Date of Patent: *May 28, 2002

(54) PATIENT WEIGHING APPARATUS

(76) Inventor: Peter Salgo, 200 W. 60th St., Apt. 33A, New York, NY (US) 10023

( * ) Notice: Subject to any disclaimer, the term of this patent is extended or adjusted under 35 U.S.C. 154(b) by 0 days.

This patent is subject to a terminal disclaimer.

(21) Appl. No.: 09/738,845

(22) Filed: Dec. 15, 2000

Related U.S. Application Data

(63) Continuation of application No. 09/261,362, filed on Mar. 3, 1999, now Pat. No. 6,180,893.

(51) Int. Cl.$^7$ .......................... G01G 19/52; G01G 3/14; G08B 21/00; A61M 31/00
(52) U.S. Cl. .................. 177/144; 177/210 R; 340/666; 604/66
(58) Field of Search ............................. 177/144, 210 R; 340/666; 604/66

(56) References Cited

U.S. PATENT DOCUMENTS

| | | | | |
|---|---|---|---|---|
| 3,656,478 A | * | 4/1972 | Swersey ..................... | 177/144 |
| 5,144,284 A | * | 9/1992 | Hammett ..................... | 340/666 |
| 5,393,935 A | * | 2/1995 | Hasty et al. ................ | 177/144 |
| 6,015,163 A | * | 1/2000 | Langford et al. ........... | 340/666 |
| 6,072,130 A | * | 6/2000 | Burgess ....................... | 340/666 |
| 6,180,893 B1 | * | 1/2001 | Salgo .......................... | 177/144 |

* cited by examiner

*Primary Examiner*—Randy W. Gibson
(74) *Attorney, Agent, or Firm*—Goodwin Procter LLP

(57) ABSTRACT

An apparatus for weighing a patient while the patient remains in bed including at least one flexible potentiometer mounted on top of a bed or mattress having a known compliance, i.e. known degree of flexure for a given weight, and connected to an electrical system for detecting and measuring the resistance of the potentiometer, so as to indicate the weight of the patient. The flexible potentiometer may also be adhered to a sheet of plastic, such as Mylar, and placed upon the bed like a protective sheet for the bed. The apparatus may include a multiple of flexible potentiometers. Further, the device to which the flexible potentiometer is connected may be used to help control servo mechanisms in medication dispensing devices such as infusion pumps and/ or hemodialysis machines (artificial kidneys).

3 Claims, 3 Drawing Sheets

PATIENT WEIGHING APPARATUS

RELATED APPLICATION(S)/CLAIM OF PRIORITY

This application is a continuation of U.S. Non-Provisional Application No. 09/261,362, which was filed on Mar. 3, 1999 now U.S. Pat. No. 6,180,893.

The entire disclosure of the foregoing patent application is incorporated by reference as if set forth at length herein.

FIELD OF THE INVENTION

This invention relates to weighing patients in a hospital bed and particularly to a new arrangement for weighing sick patients.

BACKGROUND OF THE INVENTION

There are many medical conditions which may be treated more effectively than they are today if the weight of a patient having such a condition could be easily and continuously monitored without the need to either get the patient out of bed or weigh the bed separately from the patient for weighing with the patient in combination at a later time.

The present weighing systems for bedridden patients in hospitals and/or long term care facilities include chairs and/or bulky slings coupled with scales in which a patient is moved from his/her bed for purposes of weighing. These systems are cumbersome and require a substantial amount of human intervention to operate. Many sick patients are too unstable to tolerate the amount of motion these systems require of them. Other present devices include a large scale upon which an empty bed is first weighed as a calibration followed by subsequent weighing of the patient/bed combination at a later time. A patient's weight is thus found by subtracting the initial bed weight from the combination total. Such a scale is expensive and thus represents a limited resource. These devices may not be suitable if a patient's stay in a facility extends over a prolonged period of time.

Some examples of conditions where the weight of a patient is a significant indicator of the effectiveness of treatment include, but are not limited to, Congestive Heart Failure, Open Heart Surgery, Vascular Surgery, Sepsis and Extreme Diarrhea/Intestinal Upset. Said conditions often render a patient weak, debilitated and unable to stand without assistance, thus making it almost impossible to weigh him/her in the conventional manner (i.e., standing up on a scale).

A treatment for Congestive Heart Failure includes the elimination of retained excess fluid wherein body weight is a clear indication of success or failure of said treatment. The same can be said of Open Heart Surgery, which is often characterized by Congestive Heart Failure, wherein additional fluid is added to the body during surgery. Further, during Vascular Surgery, which may often be performed on Congestive Heart Failure patients, blood vessels leak resulting in excess body water which must be excreted by the kidneys. Sepsis, which is a condition wherein bacteria is found in the blood stream, also results in leakage of water from blood vessels into tissues necessitating treatment with additional fluid in order to maintain blood pressure. Lastly, the treatment of Extreme Diarrhea and Irritated Intestines often require massive amounts of fluid recucitation to treat dehydration. For each of these conditions the patient's body weight is a marker for clinical progress or lack thereof. Indeed, all of these conditions require monitoring of the patient's body weight in order to regulate the treatment for the condition. Therefore, a simple and easy way to consistently and continuously weigh a patient throughout his/her treatment is necessary.

Thus, there is a need for a system that can monitor the weight of a patient in a hospital bed without the need to move the patient. There is a further need for such a system to be inexpensive and easy to operate.

Systems have been suggested to monitor the presence or absence of patients in hospital beds automatically, but none for continuously monitoring their weight while in the bed, independent of the bed's weight itself. It has been suggested that a bed position and activity sensing apparatus could be constructed by using an elongated sensor for placement parallel to one axis of the bed. The sensor includes first and second conductive members where the first conductive member has a resistance per unit length substantially different from that of the second conductor member. One of the conductive members is electrically coupled to a source of electrical power wherein the weight of the body in the bed urges the first and second conductive members together to define an electrical path for output of a sensor signal which varies in magnitude responsive to the position of the body along the sensor.

Such a system is shown in U.S. Pat. No. 5,353,012, which issued on Oct. 4, 1994 to Barham et al. and is entitled "Bed Position and Activity Sensing Apparatus". Other patents relating to this subject matter are U.S. Pat. No. 5,844,488 which issued Dec. 1, 1988 to Musick and is entitled "Bed Sensor and Alarm" and U.S. Pat. No. 4,565,910 which issued Jan. 21, 1986 to Mersick et al. and is entitled "Switch Apparatus Responsive to Distortion". These systems, while having an electrical device mounted in a patient's bed or adhered to a patient's sheet, are used for sensing the whereabouts of the patient and are not used for weighing the patient.

Devices exist similar to the switches of the above mentioned patents which are used as potentiometers. Such a device is disclosed in U.S. Pat. No. 5,157,372 ("the '372 patent"), which issued Oct. 20, 1992 to Langford and is entitled "Flexible Potentiometer". The '372 patent is hereby incorporated by reference as though fully set forth herein. Such devices are manufactured and sold by Flexpoint of Midvale, Utah 84047 under the title of Flexible Sensor Systems. It is known that the degree of flexure of such a device will provide a measurable resistance indicative of the curvature thereof.

BRIEF DESCRIPTION OF THE INVENTION

In the present invention, a flexible potentiometer is mounted on top of a bed or mattress having a known compliance, i.e. known degree of flexure for a given weight, and connected to an electrical system for detecting and measuring the resistance of the potentiometer, thus to indicate the weight of a patient. In one embodiment, the flexible potentiometer is adhered to a sheet of plastic, such as Mylar, and placed upon the bed like a protective sheet for the bed. In a further embodiment a plurality of flexible potentiometers are adhered to the sheet of plastic to enable weighting of the patient without regard to the position of the patient in the bed.

The output of the apparatus can be used for directly ascertaining a patient's weight and displaying/recording thus weight. The output may also be used to help control servo mechanisms in medication dispensing devices. For example, in infusion pumps the rate can be continuously adjusted as the patient's weight changes. Other such servo/ feedback devices could be applied to other devices such as hemodialysis machines (artificial kidneys).

In another embodiment, the flexible potentiometer is connected to a medicine-dispensing machine wherein a signal indicative of the resistance of the potentiometer is fed back to the medicine-dispensing unit so as to continually adjust the rate at which such medicine is dispensed.

DETAILED DESCRIPTION OF THE INVENTION

Figure 1:
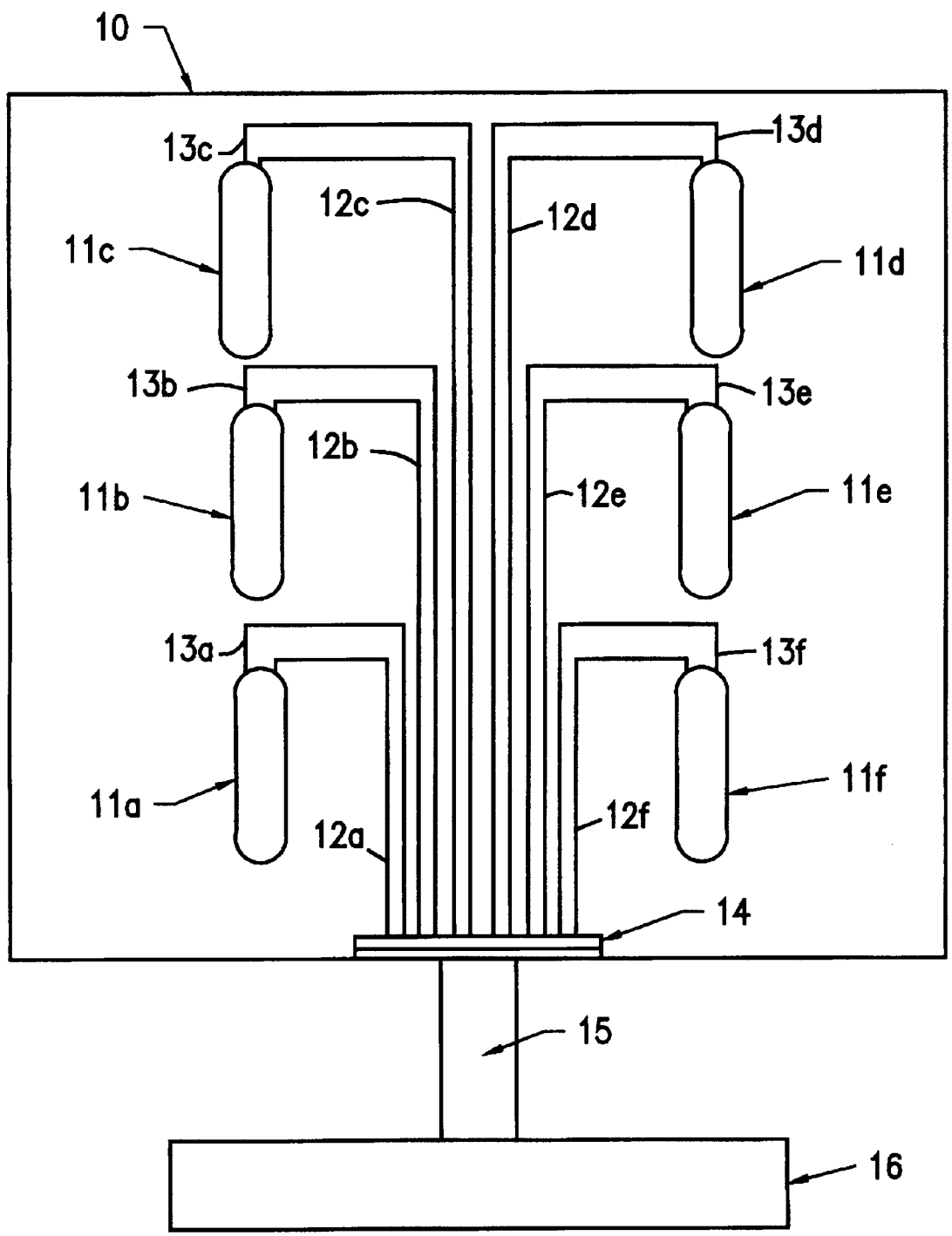
FIG. 1 is a drawing of a plastic sheet with six flexible potentiometers adhered thereto.

Referring now to FIG. 1, we see a plastic sheet 10 that has six flexible potentiometers 11a–11g adhered thereto. Each of the potentiometers is preferably a potentiometer as shown and described in U.S. Pat. No. 5,157,372 incorporated herein aforesaid. Each of the potentiometers 11a–11f has a pair of leads 12a–12f and 13a–13f respectively, connecting the potentiometer to a connector 14 at the edge of the plastic sheet 10. The conductors 12a–12f and 13a–13f may be printed conductors also adhered to the plastic sheet 10. The connector 14 is connected by a ribbon conductor cable 15 to connector 16 which is used to electrically connect each of the potentiometers 11a–11f to monitoring circuitry shown in FIGS. 2 and 3.

Figure 2:
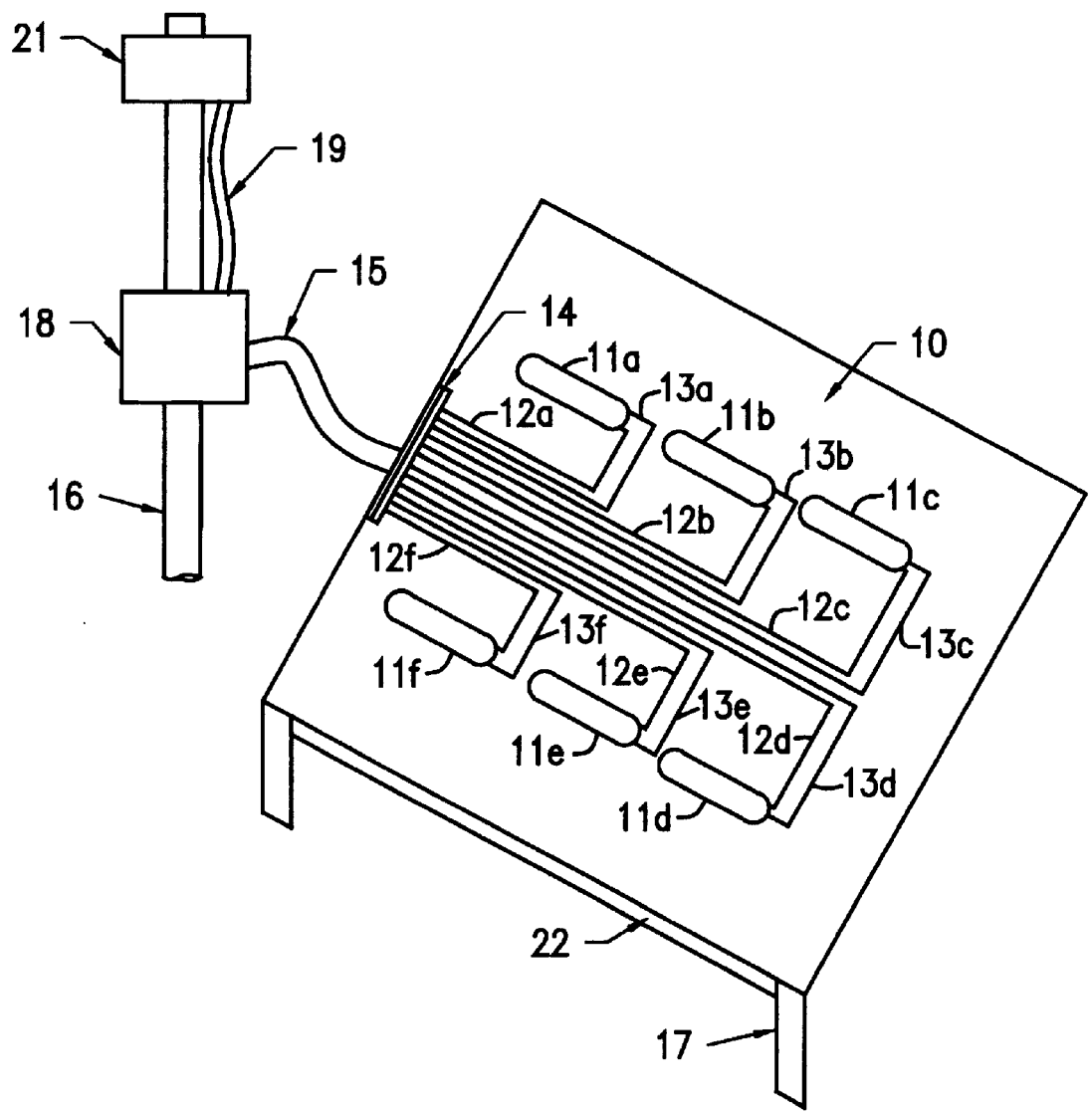
FIG. 2 is a picture of a hospital bed with the plastic sheet of FIG. 1 placed thereon wherein the potentiometers are connected to a medicine-dispensing machine.

Referring now to FIG. 2 we see a hospital bed 17 having the sheet 10 placed thereon with the potentiometers 11a–11f attached to said sheet. The conductor 15 connects the potentiometers 11a–11f on the sheet 10 to a monitoring unit 18 that is hanging on a pole 16 next to the bed 17. Said monitoring unit 18 may be stand-alone or be part of larger patient monitoring system integrated therein, such as but not limited to that sold by Hewlett Packard Company. A second ribbon conductor cable 19 connects an output signal from the monitoring unit or system 18 to an existing medicine-dispensing device 21, such as but not limited to those currently made and sold by the Ivac Corporation, Baxter Company, Marquette Company and the Alaris Company. The bed 17 has a mattress 22 supported by the bed 17 which has a known degree of flexure for each particular weight of a patient, i.e. a know compliance. If the compliance is not known, it can be measured with a known weight so as to be calibrated to the known compliance.

Figure 3:
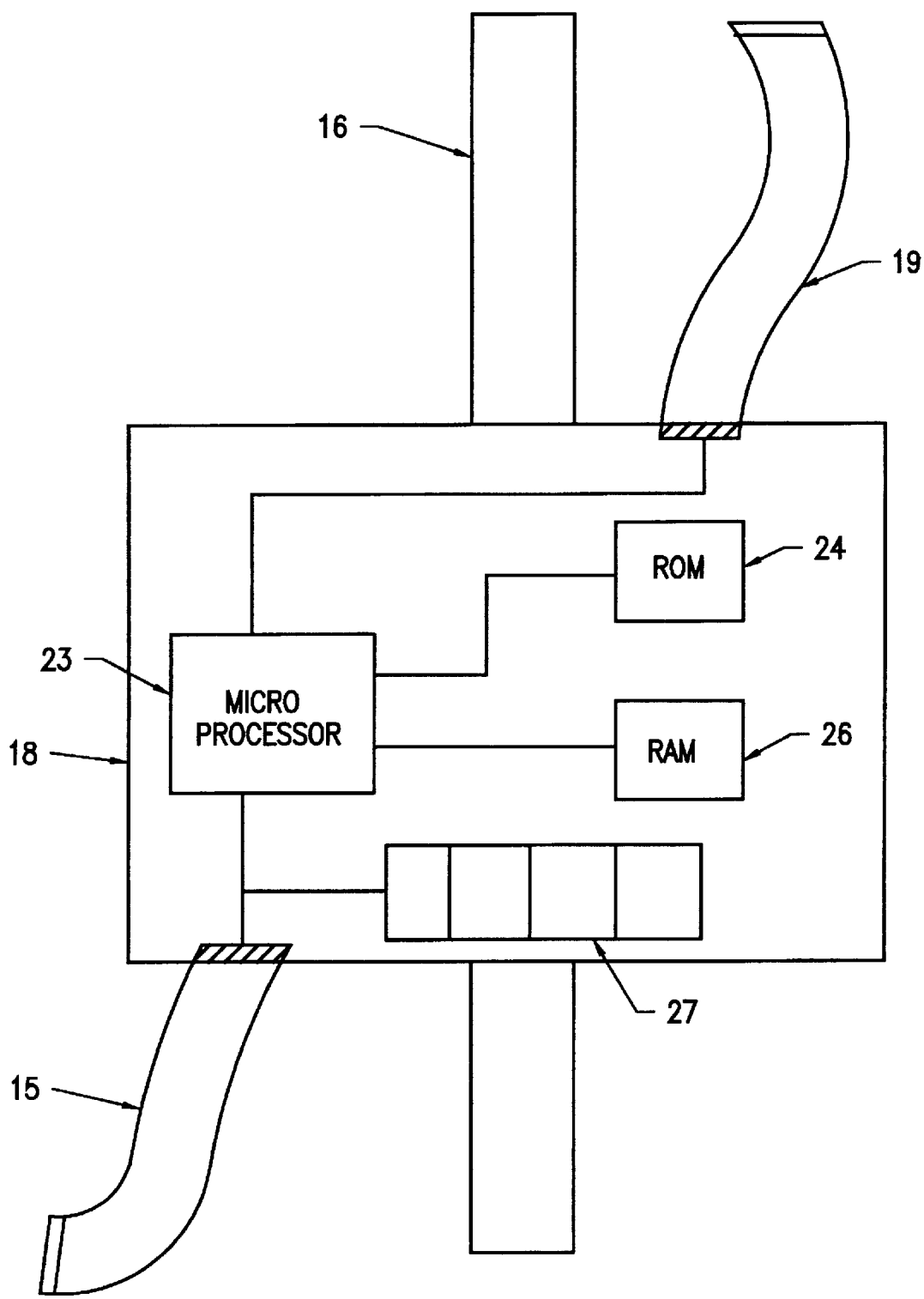
FIG. 3 is a circuit diagram of circuitry for monitoring the resistance of the potentiometers in FIG. 2.

Referring now the FIG. 3 we see the details of the monitoring unit 18. The monitoring unit 18 has a microprocessor 23 therein that is connected to the conductors 12a–12f and 13a–13f by the ribbon conductor cable 15. The microprocessor 23 is also connected to a read only memory (ROM) 24, or any other non-volatile memory, which stores therein the information relating to the resistance versus flexure characteristics of the potentiometers 11a–11f and the mattress 22 of the bed 17.

The microprocessor 23 is also connected to a random access memory (RAM) 26. The microprocessor 23 together with the RAM 26 and ROM 24 calculate the weight of the patient in the bed 17. When the multiple potentiometers 11a–11f are used the monitoring unit 18 compares the values of each of the potentiometers to determine the position of the patient in the bed 17 and calculates the patients weight, using a select one or more of the potentiometers 11a–11f, in accordance with such additional information. The result of the calculation is displayed on a LED display 27. The result is also provided to the medicine-dispensing device 21 by the ribbon cable 19 to control the rate at which the medicine is dispensed.

While this invention has been described with respect to a particular embodiment thereof, those of ordinary skill in the art can make various modifications thereof without departing from the spirit or scope thereof.

What is claimed is:

1. A system for weighing a patient, comprising:

(a) a plastic sheet assembly having a known degree of flexure for given weights;

(b) a flexible electrical device adhered to said plastic sheet assembly;

(c) a medical device and circuitry connected to said medical device for providing a signal indicative of the conductivity of said electrical device to control said medical device; and (d) an electrical monitoring system coupled to said plastic sheet assembly for monitoring the conductivity of said electrical device to indicate the weight of said patient; wherein said medical device is a medicine-dispensing machine.

2. A system for weighing a patient, comprising:

(a) a plastic sheet assembly having a known degree of flexure for given weights;

(b) a flexible electrical device adhered to said plastic sheet assembly;

(c) a medical device and circuitry connected to said medical device for providing a signal indicative of the conductivity of said electrical device to control said medical device; and (d) an electrical monitoring system coupled to said plastic sheet assembly for monitoring the conductivity of said electrical device to indicate the weight of said patient; wherein said medical device is a dialysis machine.

3. A system for weighing a patient, comprising:

(a) a plastic sheet assembly having a known degree of flexure for given weights;

(b) a flexible electrical device adhered to said plastic sheet assembly;

(c) a medical device and circuitry connected to said medical device for providing a signal indicative of the conductivity of said electrical device to control said medical device; and (d) an electrical monitoring system coupled to said plastic sheet assembly for monitoring the conductivity of said electrical device to indicate the weight of said patient; wherein said medical device is an intravenous fluid-dispensing machine.

* * * * *